(12) United States Patent
Lin (10) Patent No.: US 12,362,641 B2
(45) Date of Patent: Jul. 15, 2025

(54) CYLINDRICAL IMPACT LINEAR MOTOR AND MANUFACTURING METHOD THEREFOR

(71) Applicant: Ming-Hung Lin, Guangdong (CN)

(72) Inventor: Ming-Hung Lin, Guangdong (CN)

( * ) Notice: Subject to any disclaimer, the term of this patent is extended or adjusted under 35 U.S.C. 154(b) by 229 days.

(21) Appl. No.: 18/076,796

(22) Filed: Dec. 7, 2022

(65) Prior Publication Data

US 2024/0195277 A1    Jun. 13, 2024

(51) Int. Cl.
*H02K 33/16*    (2006.01)

(52) U.S. Cl.
CPC ..................... *H02K 33/16* (2013.01)

(58) Field of Classification Search
CPC ......... H02K 33/16; H02K 35/00; H02K 35/02
USPC .......................................................... 310/28
See application file for complete search history.

(56) References Cited

U.S. PATENT DOCUMENTS

| | | | | |
|---|---|---|---|---|
| 5,434,549 A * | 7/1995 | Hirabayashi | ........... | H02K 33/16 335/229 |
| 6,239,517 B1 * | 5/2001 | Nakamura | .............. | B41J 25/006 400/322 |
| 2013/0285479 A1 * | 10/2013 | Kinoshita | .............. | H02K 35/02 310/12.12 |
| 2014/0246944 A1 * | 9/2014 | Koka | ..................... | H02K 1/165 310/216.069 |

(Continued)

FOREIGN PATENT DOCUMENTS

| | | | | |
|---|---|---|---|---|
| JP | 2011176966 A | * | 9/2011 | ............... H02K 1/34 |
| KR | 20110121201 A | * | 11/2011 | |

OTHER PUBLICATIONS

Iijima (JP 2011176966 A) English Translation (Year: 2011).*
Sung (KR 20110121201 A) English Translation (Year: 2011).*

*Primary Examiner* — Tulsidas C Patel
*Assistant Examiner* — Robert E Mates (57) ABSTRACT

The present invention discloses a cylindrical impact linear motor and a manufacturing method therefor. A cylindrical impact linear motor includes a main housing and a vibrator assembly arranged in a central cavity. The main housing is provided with two anti-collision structures. The vibrator assembly includes two strong magnetic strips which are axially connected in series to each other and have poles with the same polarity adjacent to each other, and a magnetic isolation member arranged between the two strong magnetic strips. The cylindrical impact linear motor further includes an electromagnetic coil embedded in the main housing and located on an outer periphery of the vibrator assembly. The direction and magnitude of a current conducted by the electromagnetic coil are changed to form an axial movement of the vibrator assembly in proportion to the change of the current, thereby forming an impact frequency and an impact force in proportion. The vibrator assembly of the present invention uses two strong magnetic strips having poles with the same polarity adjacent to each other and a magnetic isolation member arranged between the two strong magnetic strips, so that a magnetic field extends in the radial direction, the generated magnetic field is limited to a smaller range, and the movement range of the magnetic field of the vibrator assembly during vibration is reduced, thereby reducing the influence on the coil and providing a better vibration effect.

9 Claims, 6 Drawing Sheets

(56) References Cited

U.S. PATENT DOCUMENTS

2021/0265902 A1* 8/2021 Wang ..................... B06B 1/045
2021/0359584 A1* 11/2021 Lewis ..................... H02K 5/22

* cited by examiner

CYLINDRICAL IMPACT LINEAR MOTOR AND MANUFACTURING METHOD THEREFOR

TECHNICAL FIELD

The present invention relates to a linear motor, and in particular to a cylindrical impact linear motor with anti-collision structures and a manufacturing method.

BACKGROUND

Rod-like products that need to generate vibration (whether it is axial vibration or radial vibration) in the market are mainly realized by the use of a motor with an eccentric swing block. However, the amplitude is affected by the eccentric structure and cannot be adjusted, and only the frequency can be adjusted.

A linear motor is a product that uses electromagnetic force to produce movement, and a power component of the linear motor is generally arranged externally, and is rarely used in vibration devices.

It is necessary to develop a new product, which can produce vibration by using the electromagnetic principle of linear motors. At the same time, it is necessary to develop a method for producing and manufacturing such a new product.

SUMMARY

Aiming at the above problems existing in the prior art, the present invention provides a cylindrical impact linear motor and a manufacturing method therefor.

The purpose of the present invention is realized by the following technical schemes.

A cylindrical impact linear motor of the present invention includes a cylindrical main housing having a central cavity, and a vibrator assembly arranged in the central cavity, wherein the main housing is provided with two anti-collision structures located at two ends of the vibrator assembly; the vibrator assembly includes two strong magnetic strips which are axially connected in series to each other and have poles with the same polarity adjacent to each other, and a magnetic isolation member arranged between the two strong magnetic strips; the cylindrical impact linear motor further includes an electromagnetic coil embedded in the main housing and located on an outer periphery of the vibrator assembly; and a change in direction and magnitude of a current conducted by the electromagnetic coil causes a change in magnitude and direction of a magnetic field force, so as to form an axial movement of the vibrator assembly in proportion to the change of the current, thereby forming an impact frequency and an impact force in proportion.

Optionally, the anti-collision structures each include an end cap fixed to an end portion of the main housing, and an anti-collision rubber pad arranged inside the end cap.

Optionally, the anti-collision structures each further include a homing magnet arranged at the center of the end cap for forming a magnetic field force for the centering and homing of the vibrator assembly when de-energized.

Optionally, a printed circuit board (PCB) is provided on an outer side of one of the end caps, and the PCB is electrically connected to the electromagnetic coil.

Optionally, the main housing is provided with an opening on an outer side of the electromagnetic coil, and a coil cover corresponding to the opening.

Optionally, two snap rings respectively located at two ends of the electromagnetic coil are provided in the central cavity for axially fixing the electromagnetic coil; and the coil cover is fixed to the opening in a snap-fit manner.

Optionally, the coil cover and the main housing form a cylindrical outer surface to which a label is attached.

Optionally, the strong magnetic strips and the magnetic isolation member are both cylindrical and are each provided with a central hole through which a non-magnetic fixing member passes for fixed coupling.

Optionally, the non-magnetic fixing member includes a copper threaded rod and a copper screw.

A method for manufacturing the cylindrical impact linear motor of present invention includes the following assembling steps: embedding an electromagnetic coil into the central cavity through the opening of the main housing first; then causing the vibrator assembly to pass into the electromagnetic coil from one end of the central cavity; and then fixing the two anti-collision structures to two ends of the main housing respectively via screws; and the assembly steps further adopt an automatic assembly mode using an automatic conveying guide rail, with the opening of the main housing placed upward and the steps starting from a loading station, wherein at a first station, which is the loading station, the main housing is placed within a jig provided at the first station;

at a second station, the electromagnetic coil is put into the central cavity through the opening;

at a third station, the vibrator assembly is passed by a pushing mechanism into the electromagnetic coil in the central cavity from the end of the central cavity;

at a fourth station, the two anti-collision structures are fixedly coupled to outer ends of the main housing respectively by using a screw driving machine;

at a fifth station, labeling is done; and at a sixth station, which is a discharge station, the assembled product is removed from the jig.

wherein the jig is installed in a reciprocating slide rail from the loading station through to the discharge station; and a vertical rotary conveying guide rail or a horizontal rotary conveying guide rail is used.

Generally speaking, compared with the prior art, the present invention has the following beneficial effects. The vibrator assembly of the present invention uses two strong magnetic strips having poles with the same polarity adjacent to each other and a magnetic isolation member arranged between the two strong magnetic strips, so that a magnetic field extends in the radial direction, the generated magnetic field is limited to a smaller range, and the movement range of the magnetic field of the vibrator assembly during vibration is reduced, thereby reducing the influence on the coil and providing a better vibration effect. Under the magnetic field of the electromagnetic coil, the magnitude and direction of the magnetic field force are changed to form an axial movement of the vibrator assembly in proportion to the change of the current, thereby forming an impact frequency and an impact force in proportion. The present invention can be applied to rod-type products, such as rod-type earphones, medical products, rehabilitation instruments and adult products, and has wide application space. Further, the homing magnets are arranged at two ends, so that the vibrator assembly is in a centered position when not working, and keeps a relatively fixed position. The opening is provided on the main housing for easy assembly. The use of the snap rings makes the installation and fixing the electromagnetic coil easy. The coil cover is provided with a coupling pin, which cooperates with a coupling hole provided in the edge of the opening of the main housing to form a fixed coupling relationship in a snap-fit manner, so that the installation is easy and a complete cylindrical surface is ensured in appearance.

LIST OF REFERENCE NUMERALS

10 Main housing
100 Central cavity
111 Coupling hole
12 Coil cover
121 Coupling pin
13 Snap ring
14 Label
20 Vibrator assembly
200 Central hole
21 Strong magnetic strip
22 Magnetic isolation
24 Copper threaded rod
25 Copper screw
30 Anti-collision structure
31 End cap
33 Homing magnet
34 PCB
40 Electromagnetic coil

DETAILED DESCRIPTION

In order to fully understand the technical content of the present invention, the technical scheme of the present invention is further introduced and explained in connection with specific embodiments, but is not limited thereto.

As shown in the embodiment of FIGS. 1-6, the present invention provides a cylindrical impact linear motor, including a cylindrical main housing 10 having a central cavity 100, and a vibrator assembly 20 arranged in the central cavity 100. The main housing 10 is provided with two anti-collision structures 30 located at two ends of the vibrator assembly 20. The vibrator assembly 20 includes two strong magnetic strips 21 which are axially connected in series to each other and have poles with the same polarity adjacent to each other, and a magnetic isolation member 22 arranged between the two strong magnetic strips 21. The cylindrical impact linear motor further includes an electromagnetic coil 40 embedded in the main housing 10 and located on an outer periphery of the vibrator assembly 20. A change in direction and magnitude of a current conducted by the electromagnetic coil 40 causes a change in magnitude and direction of a magnetic field force, so as to form an axial movement of the vibrator assembly 20 in proportion to the change of the current, and further to form an impact frequency and an impact force in proportion.

Figure 5:
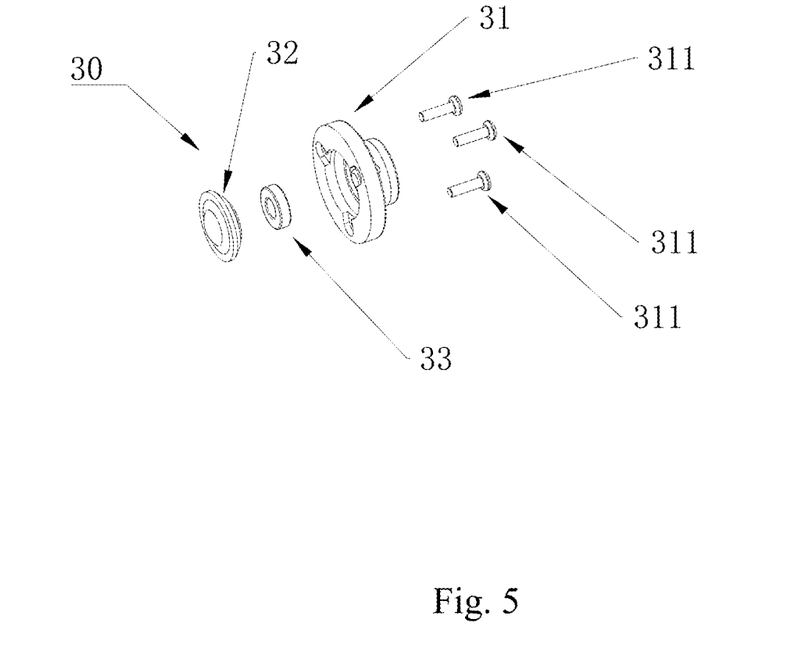
FIG. 5 is a perspective view of a right end anti-collision structure of the embodiment of FIG. 1.
Figure 6:
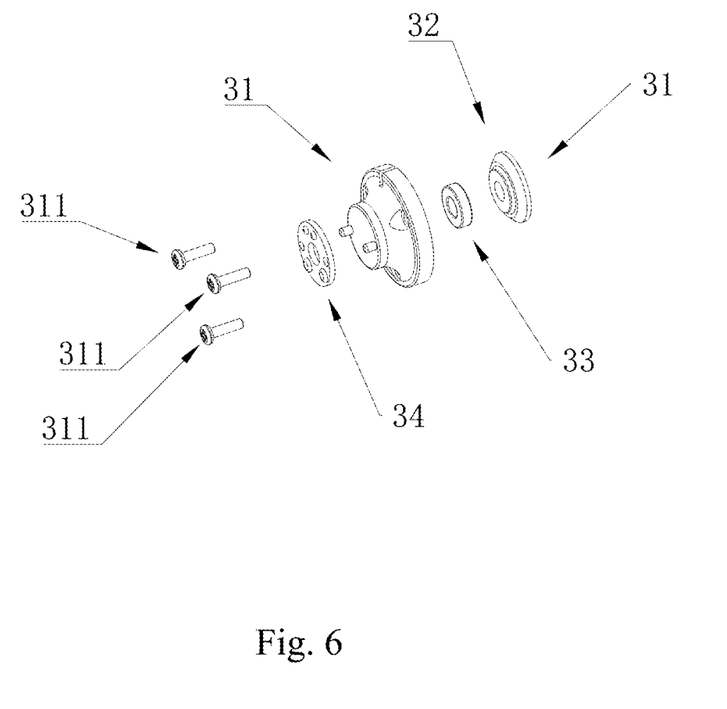
FIG. 6 is a perspective view of a left end anti-collision structure of the embodiment of FIG. 1.

More specifically, the anti-collision structures 30 each include an end cap 31 fixed to an end portion of the main housing 10, and an anti-collision rubber pad 32 arranged inside the end cap 31. The end cap 31 is fixed to the end portion of the main housing 10 via screws 311. The anti-collision rubber pad may be anti-collision silicone, so that the vibrator assembly can play an anti-impact role when overloaded.

More specifically, the anti-collision structures 30 each further include a homing magnet 33 arranged at the center of the end cap 31 for forming a magnetic field force for the centering and homing of the vibrator assembly 20 when de-energized. That is, when there is no electricity, the vibrator assembly 20 is kept in the centered position under the action of the magnetic field forces of the two homing magnets 33.

More specifically, a PCB 34 is provided on an outer side of the end cap 31 at the left end, and the PCB 34 is electrically connected to the electromagnetic coil 40.

Figure 3:
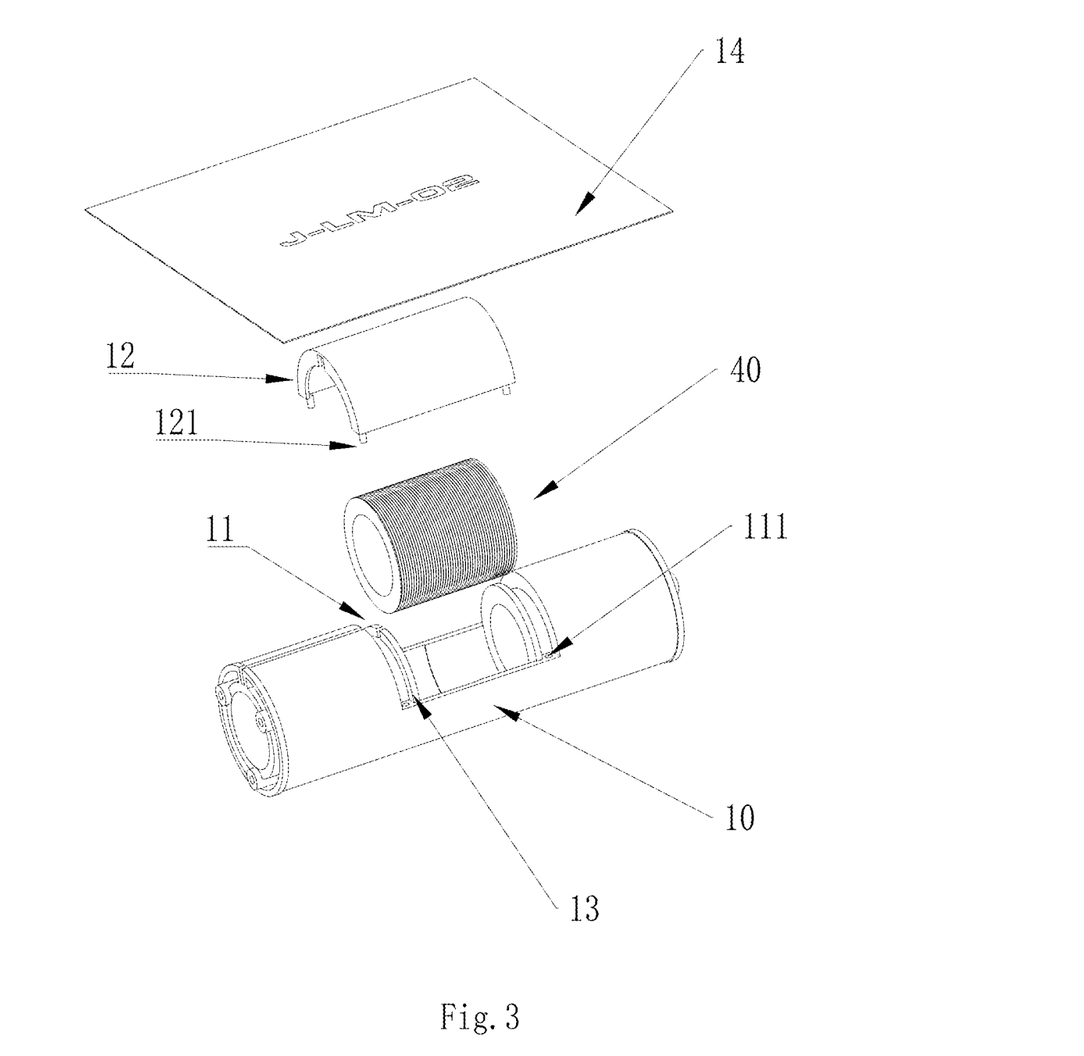
FIG. 3 is a perspective view of a main housing of the embodiment of FIG. 1 (in which a label is in a deployed state)

More specifically, the main housing 10 is provided with an opening 11 on an outer side of the electromagnetic coil 40, and a coil cover 12 corresponding to the opening 11.

Figure 1:
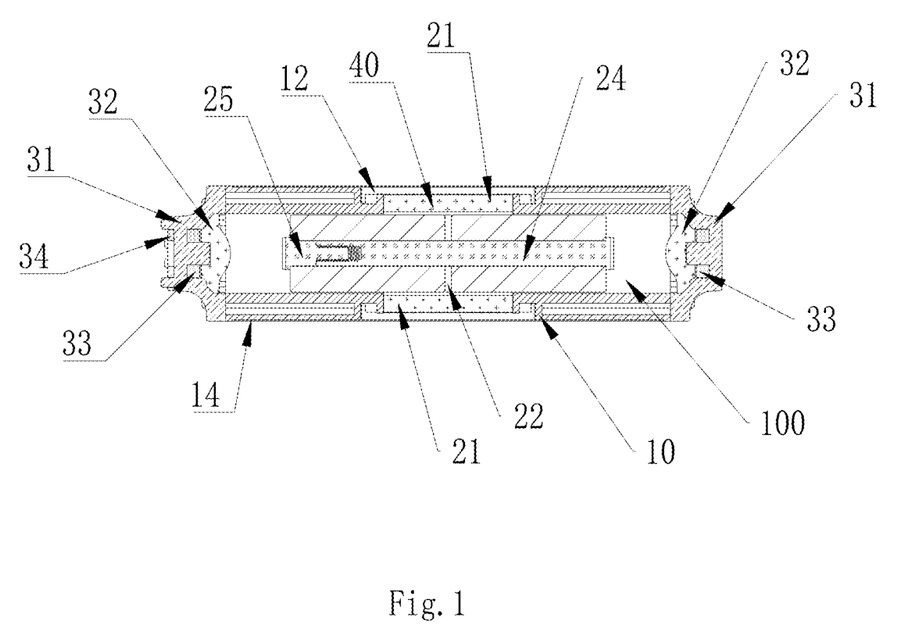
FIG. 1 is a sectional view of a particular embodiment of a cylindrical impact linear motor of the present invention.
Figure 2:
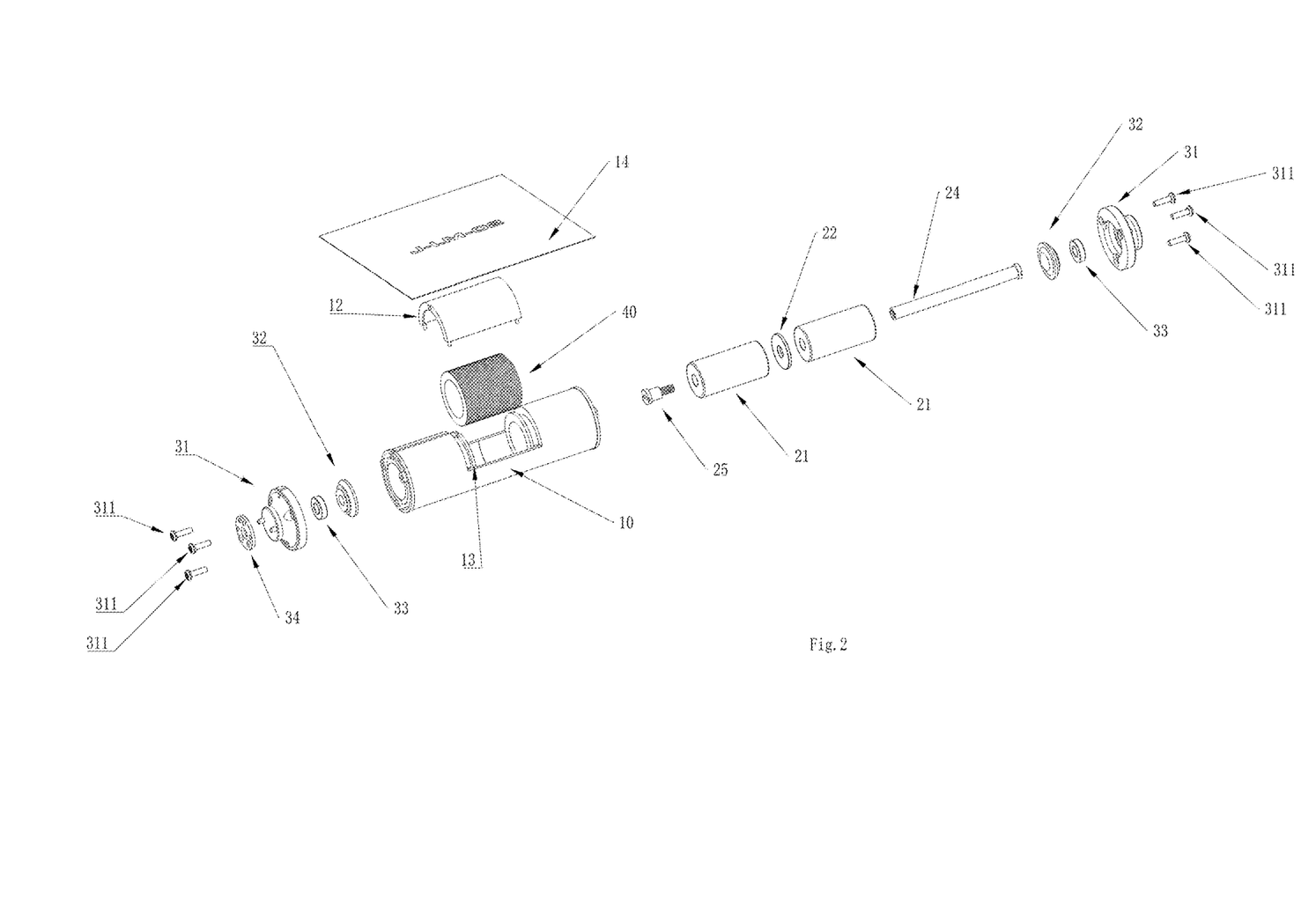
FIG. 2 is an exploded perspective view of the embodiment of FIG. 1.

More specifically, two snap rings 13 respectively located at two ends of the electromagnetic coil 40 are provided in the central cavity 100 for axially fixing the electromagnetic coil 40; and the coil cover 12 is fixed to the opening 11 in a snap-fit manner. The coil cover 12 is provided with a coupling pin 121, which cooperates with a coupling hole 111 provided in the edge of the opening 11 of the main housing 10 to form a fixed coupling relationship in a snap-fit manner, so that the installation is easy and a complete cylindrical surface is ensured in appearance.

More specifically, the coil cover 12 and the main housing 10 form a cylindrical outer surface to which a label 14 is attached.

Figure 4:
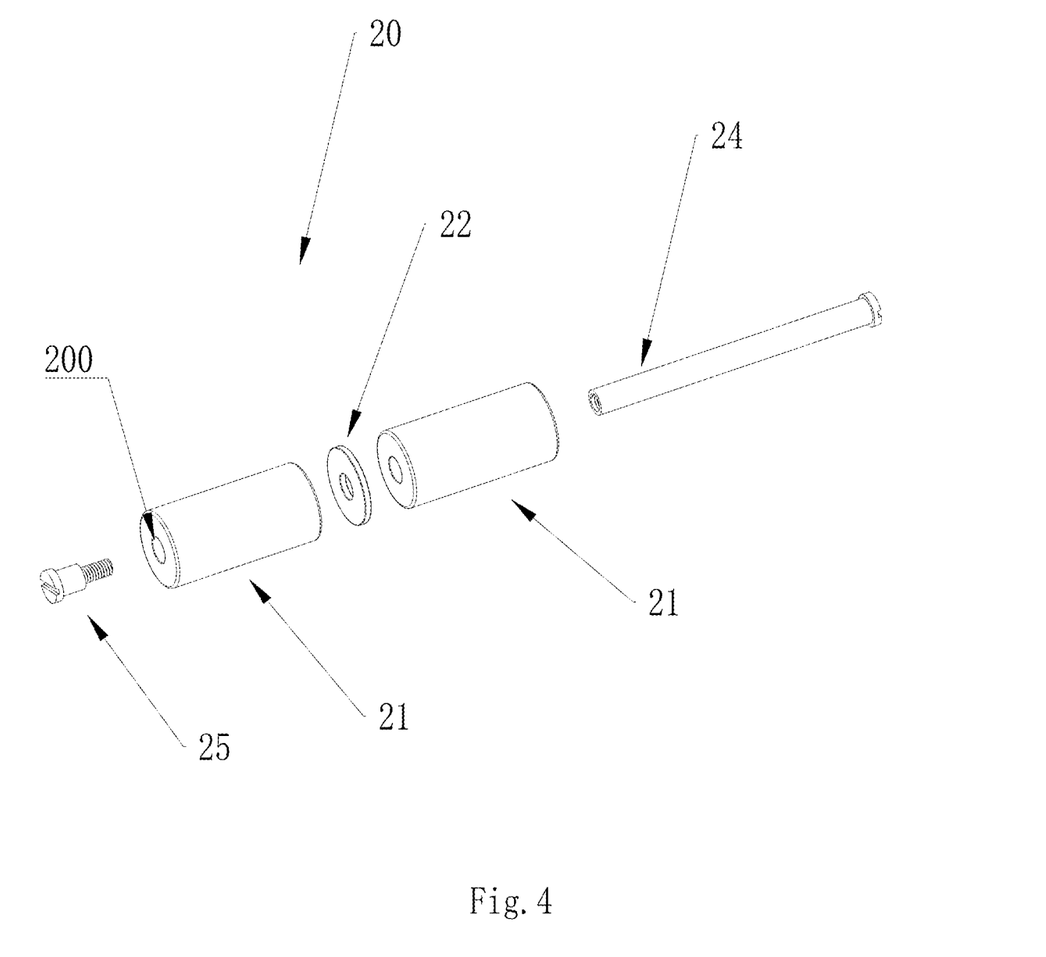
FIG. 4 is a perspective view of a vibrator assembly of the embodiment of FIG. 1.

More specifically, the strong magnetic strips 21 and the magnetic isolation member 22 are both cylindrical and are each provided with a central hole 200 through which a non-magnetic fixing member passes for fixed coupling.

More specifically, the non-magnetic fixing member includes a copper threaded rod 24 and a copper screw 25. The non-magnetic fixing member may also be of aluminum or other non-magnetic materials.

A method for manufacturing the cylindrical impact linear motor of present invention includes the following assembling steps: embedding an electromagnetic coil into the central cavity through the opening of the main housing first; then causing the vibrator assembly to pass into the electromagnetic coil from one end of the central cavity; and then fixing the two anti-collision structures to two ends of the main housing respectively via screws; and the assembly steps further adopt an automatic assembly mode using an automatic conveying guide rail, with the opening of the main housing placed upward and the steps starting from a loading station, wherein at a first station, which is the loading station, the main housing is placed within a jig provided at the first station;

at a second station, the electromagnetic coil is put into the central cavity through the opening;

at a third station, the vibrator assembly is passed by a pushing mechanism into the electromagnetic coil in the central cavity from the end of the central cavity;

at a fourth station, the two anti-collision structures are fixedly coupled to outer ends of the main housing respectively by using a screw driving machine;

at a fifth station, labeling is done; and at a sixth station, which is a discharge station, the assembled product is removed from the jig, wherein the jig is installed in a reciprocating slide rail moving from the loading station to the discharge station; and a vertical rotary conveying guide rail or a horizontal rotary conveying guide rail is used.

More specifically, the jig is provided with an arc-shaped recess for receiving the main housing. When the main housing is put into the recess, a pressing block is used to press the opening to position the opening in a rotation direction, and then a vacuum suction hole in the recess is used for fixing by means of vacuum suction until the assembly is completed. The pressing block is removed after the main housing is fixed.

Still further, the pressing block may be installed above the loading station and moved up and down by a lifting cylinder. In this way, automatic installation can be realized and the efficiency of production and installation can be improved.

To sum up, the vibrator assembly of the present invention uses two strong magnetic strips having poles with the same polarity adjacent to each other and a magnetic isolation member arranged between the two strong magnetic strips, so that a magnetic field extends in the radial direction, the generated magnetic field is limited to a smaller range, and the movement range of the magnetic field of the vibrator assembly during vibration is reduced, thereby reducing the influence on the coil and providing a better vibration effect. Under the magnetic field of the electromagnetic coil, the magnitude and direction of the magnetic field force are changed to form an axial movement of the vibrator assembly in proportion to the change of the current, thereby forming an impact frequency and an impact force in proportion. The present invention can be applied to rod-type products, such as rod-type earphones, medical products, rehabilitation instruments and adult products, and has wide application space. Further, the homing magnets are arranged at two ends, so that the vibrator assembly is in a centered position when not working, and keeps a relatively fixed position. The opening is provided on the main housing for easy assembly. The use of the snap rings makes the installation and fixing the electromagnetic coil easy. The coil cover is provided with a coupling pin, which cooperates with a coupling hole provided in the edge of the opening of the main housing to form a fixed coupling relationship in a snap-fit manner, so that the installation is easy and a complete cylindrical surface is ensured in appearance.

The above embodiments are used merely to further explain the technical content of the present invention, so that readers can understand the present invention more easily, and it is not intended that the embodiments of the present invention are limited thereto, and any technical extension or re-creation according to the present invention is protected by the present invention. The scope of protection of the present invention is subject to the appended claims.

What is claimed is:

1. A cylindrical impact linear motor, comprising
a cylindrical main housing having a central cavity, and
a vibrator assembly arranged in the central cavity, wherein the main housing is provided with two anti-collision structures located at two ends of the vibrator assembly; the vibrator assembly comprises two strong magnetic strips which are axially connected in series to each other and have poles with the same polarity adjacent to each other, and a magnetic isolation member arranged between the two strong magnetic strips; the cylindrical impact linear motor further comprises an electromagnetic coil embedded in the main housing and located on an outer periphery of the vibrator assembly; and a change in direction and magnitude of a current conducted by the electromagnetic coil causes a change in magnitude and direction of a magnetic field force, so as to form an axial movement of the vibrator assembly in proportion to the change of the current, thereby forming an impact frequency and an impact force in proportion;

wherein the main housing is provided with an opening on an outer side of the electromagnetic coil, and a coil cover corresponding to the opening.

2. The cylindrical impact linear motor of claim 1, wherein the anti-collision structures each comprise an end cap fixed to an end portion of the main housing, and an anti-collision rubber pad arranged inside the end cap.

3. The cylindrical impact linear motor of claim 2, wherein the anti-collision structures each further comprise a homing magnet arranged at the center of the end cap for forming a magnetic field force for the centering and homing of the vibrator assembly when de-energized.

4. The cylindrical impact linear motor of claim 2, wherein a printed circuit board (PCB) is provided on an outer side of one of the end caps, and the PCB is electrically connected to the electromagnetic coil.

5. The cylindrical impact linear motor of claim 1, wherein two snap rings respectively located at two ends of the electromagnetic coil are provided in the central cavity for axially fixing the electromagnetic coil; and the coil cover is fixed to the opening in a snap-fit manner.

6. The cylindrical impact linear motor of claim 5, wherein the coil cover and the main housing form a cylindrical outer surface to which a label is attached.

7. A method for manufacturing the cylindrical impact linear motor of claim 6, the method comprising the following assembling steps: embedding an electromagnetic coil into the central cavity through the opening of the main housing first; then causing the vibrator assembly to pass into the electromagnetic coil from one end of the central cavity; and then fixing the two anti-collision structures to two ends of the main housing respectively via screws, wherein the assembly steps further adopt an automatic assembly mode using an automatic conveying guide rail, with the opening of the main housing placed upward and the steps starting from a loading station, wherein at a first station, which is the loading station, the main housing is placed within a jig provided at the first station;

at a second station, the electromagnetic coil is put into the central cavity through the opening;

at a third station, the vibrator assembly is passed by a pushing mechanism into the electromagnetic coil in the central cavity from the one end of the central cavity;

at a fourth station, the two anti-collision structures are fixedly coupled to outer ends of the main housing respectively by using a screw driving machine;

at a fifth station, labeling is done; and at a sixth station, which is a discharge station, the assembled product is removed from the jig, wherein the jig is installed in a reciprocating slide rail from the loading station through to the discharge station; and a vertical rotary conveying guide rail or a horizontal rotary conveying guide rail is used.

8. The cylindrical impact linear motor of claim 1, wherein the strong magnetic strips and the magnetic isolation member are both cylindrical and are each provided with a central hole through which a non-magnetic fixing member passes for fixed coupling.

9. The cylindrical impact linear motor of claim 8, wherein the non-magnetic fixing member comprises a copper threaded rod and a copper screw.

* * * * *